US007634727B2

(12) United States Patent
Maciesowicz et al.

(10) Patent No.: US 7,634,727 B2
(45) Date of Patent: Dec. 15, 2009

(54) SYSTEM FOR ABSTRACTING AUDIO-VIDEO CODECS

(75) Inventors: Maciej Maciesowicz, Duvall, WA (US);
Barry Steinglass, Redmond, WA (US);
Derek Smith, Snohomish, WA (US);
David Pickford, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/114,510

(22) Filed: Apr. 26, 2005

(65) Prior Publication Data

US 2006/0242551 A1    Oct. 26, 2006

(51) Int. Cl.
*G06F 17/00* (2006.01)
(52) U.S. Cl. .................. 715/249; 715/243; 715/273
(58) Field of Classification Search ............... 715/500, 715/500.1, 511, 515, 517, 523, 526, 200, 715/201, 229, 209, 243, 249, 273
See application file for complete search history.

(56) References Cited

U.S. PATENT DOCUMENTS

| | | | | |
|---|---|---|---|---|
| 6,216,152 | B1* | 4/2001 | Wong et al. | 709/203 |
| 6,452,600 | B1* | 9/2002 | Parikh et al. | 345/522 |
| 6,523,046 | B2 | 2/2003 | Liu et al. | |
| 6,572,475 | B1* | 6/2003 | Okabe et al. | 463/30 |
| 6,697,074 | B2* | 2/2004 | Parikh et al. | 345/522 |
| 6,934,906 | B1* | 8/2005 | Cheok | 715/500.1 |
| 7,080,152 | B2* | 7/2006 | Bodin et al. | 709/231 |
| 7,295,608 | B2* | 11/2007 | Reynolds et al. | 375/240.01 |
| 7,302,102 | B2* | 11/2007 | Reynolds et al. | 382/232 |
| 2003/0084283 | A1* | 5/2003 | Pixton | 713/163 |
| 2003/0231870 | A1 | 12/2003 | Nagahara et al. | |
| 2004/0045030 | A1* | 3/2004 | Reynolds et al. | 725/110 |
| 2004/0086039 | A1* | 5/2004 | Reynolds et al. | 375/240.01 |
| 2004/0128421 | A1 | 7/2004 | Forbes | |
| 2004/0165783 | A1* | 8/2004 | Reynolds et al. | 382/239 |
| 2005/0018768 | A1* | 1/2005 | Mabey et al. | 375/240.2 |
| 2005/0033758 | A1* | 2/2005 | Baxter | 707/100 |
| 2005/0135792 | A1* | 6/2005 | Han | 386/125 |
| 2005/0273825 | A1* | 12/2005 | Eldeeb | 725/81 |
| 2006/0184973 | A1* | 8/2006 | de Heer et al. | 725/80 |

* cited by examiner

*Primary Examiner*—Stephen S Hong
*Assistant Examiner*—Gregory J Vaughn
(74) *Attorney, Agent, or Firm*—Woodcock Washburn LLP (57) ABSTRACT

A game system utilizes a codecs abstraction layer (CAL) to allow the game system to accommodate new and/or modified codecs without requiring the game application code to be modified. The CAL, functioning as an application programming interface (API), operates between media sources and the game application. The game application interacts with the CAL and not the codec. Differences between codecs are transparent to the game application. New codecs can be introduced and used by existing applications without modifying the existing application code. The CAL processes media from a variety of sources such as memory, files, http sources, queues, custom sources, external drives, or game media sources (e.g., XMedia). The CAL determines the source of the media, the type of media being received (e.g., audio, video, image, animation, or game), and the codec used to compress the media. The CAL provides the decoded media to the game application.

18 Claims, 6 Drawing Sheets

CAL Class Hierarchy

SYSTEM FOR ABSTRACTING AUDIO-VIDEO CODECS

FIELD OF THE INVENTION

The present invention generally relates to game systems, and more specifically to an application programming interface (API) for interfacing a game system application with a variety of codecs.

BACKGROUND OF THE INVENTION

Game systems are known in the art. Example game systems include Microsoft Corporation's Xbox® and Xenon game systems. The ever changing dynamic multi-media industry is having an impact on game systems. Further, user preferences change. What is popular today may not be popular tomorrow. New and improved multi-media formats and compression schemes are continuously being marketed. For example, new/improved codecs are frequently developed and implemented. A codec is a compression and decompression algorithm that can be implemented in software, hardware, or a combination thereof. Typically, a codec is used to translate media (e.g., video, audio, image, game) between its stored or transmitted compressed form and its rendered uncompressed form. Generally, as new codecs are implemented, applications interfacing with the new codecs must be modified to be compatible with them. This can be time consuming, burdensome and expensive. This is especially true in game systems because game systems already in the hands of users are not readily modifiable.

As new codecs are developed, as existing codecs are modified, or as user preferences change, it would be advantageous for game systems to be compatible with the new/modified codecs without requiring modification of the game application. Thus, a game system allowing implementation of new and/or modified codecs without requiring a modification to the game application code is desired.

SUMMARY OF THE INVENTION

In an exemplary embodiment of the present invention, a codecs abstraction layer is implemented between a media source and a game application. The codecs abstraction layer (CAL) is implemented in the form of a computer program, or programs, and in an exemplary embodiment is implemented as an application programming interface (API). The CAL is capable of processing media from a variety of sources, encoded in accordance with a variety of codecs. The CAL is also capable of decoding the encoded media in accordance with the appropriate codec. The CAL provides the decoded media to the game application. The CAL determines the source of the media, the type of media being received, and the codec used to compress the media. Media sources include memory, a file, an http source, a queue, a custom source, an external drive, or a game media source (e.g., XMedia), for example. Media types include audio media, video media, image media, animation, game media, or a combination thereof, for example. The CAL ensures that media is appropriately obtained and formatted from the media source, and that the encoded media is properly decoded for rendering via a game media player. The game application interacts with the CAL and not the codec. Differences between codecs are irrelevant to the game application. New codecs can be introduced and used by existing applications without modifying the existing application code.

DETAILED DESCRIPTION OF ILLUSTRATIVE EMBODIMENTS

As technology improves and user demands increase, new codecs will be developed and existing codecs will be modified. Thus, it would be advantageous for game developers to develop game systems capable of accommodating new codecs and modified codecs. A game system in accordance with an exemplary embodiment of the present invention is capable of accommodating new and modified codecs without requiring modifications to the game application. This is accomplished by implementing an extensible codecs abstraction layer (CAL). The CAL manages the different codecs and media formats such that the game application interacts with the CAL, and not a specific codec.

Codec is an abbreviation for compression and decompression. Media is compressed to reduce the size, or amount, of the media information. Compressed media is decompressed to obtain the original media, or an approximation to the original media. Typically, compression techniques are lossy, meaning that information that is redundant or is not perceivable to a user is discarded and not retrievable. Compression and decompression are typically more sophisticated than the names may imply. Compressing media involves encoding the media in accordance with sophisticated signal processing techniques and decompressing the compressed media involves decoding the media in accordance with sophisticated signal processing techniques of the same codec.

Many types of codecs are currently in existence and many existing codecs are used with a variety of formats. For example, Pulse Code Modulation (PCM) is used for transmitting and storing uncompressed media. PCM is a generic algorithm used by many applications and devices, such as CDs and digital audio tapes (DATs), for example. Variations of PCM include differential pulse code modulation (DPCM) and adaptive differential pulse code modulation (ADPCM). DPCM is a lossy compression technique that uses the difference between consecutive samples of the media. ADPCM is similar to DPCM, except that the number of bits used to represent the difference between samples varies depending upon characteristics of the media signal. PCM and its variants are commonly used for WAV files. A WAV file is a default format used on WINDOWS® PCs. WAV files can also be encoded in the MP3 format. MP3 is a moving picture experts group (MPEG) Layer-III format. MP3 provides a relatively high level of compression and thus is commonly used to provide media over the Internet, to store media on devices having limited storage capacity, and on portable players. Advanced Audio Coding (AAC), also referred to as MP4, is an encoding/decoding technique that provides better quality media at lower bit-rates than MP3. Another format, known as µ-law compression, is a lossy format that can be used on WAV files. Further, Microsoft Corporation has developed codecs for use with media formatted in accordance with the Windows Media Audio (WMA) format.

Figure 1:
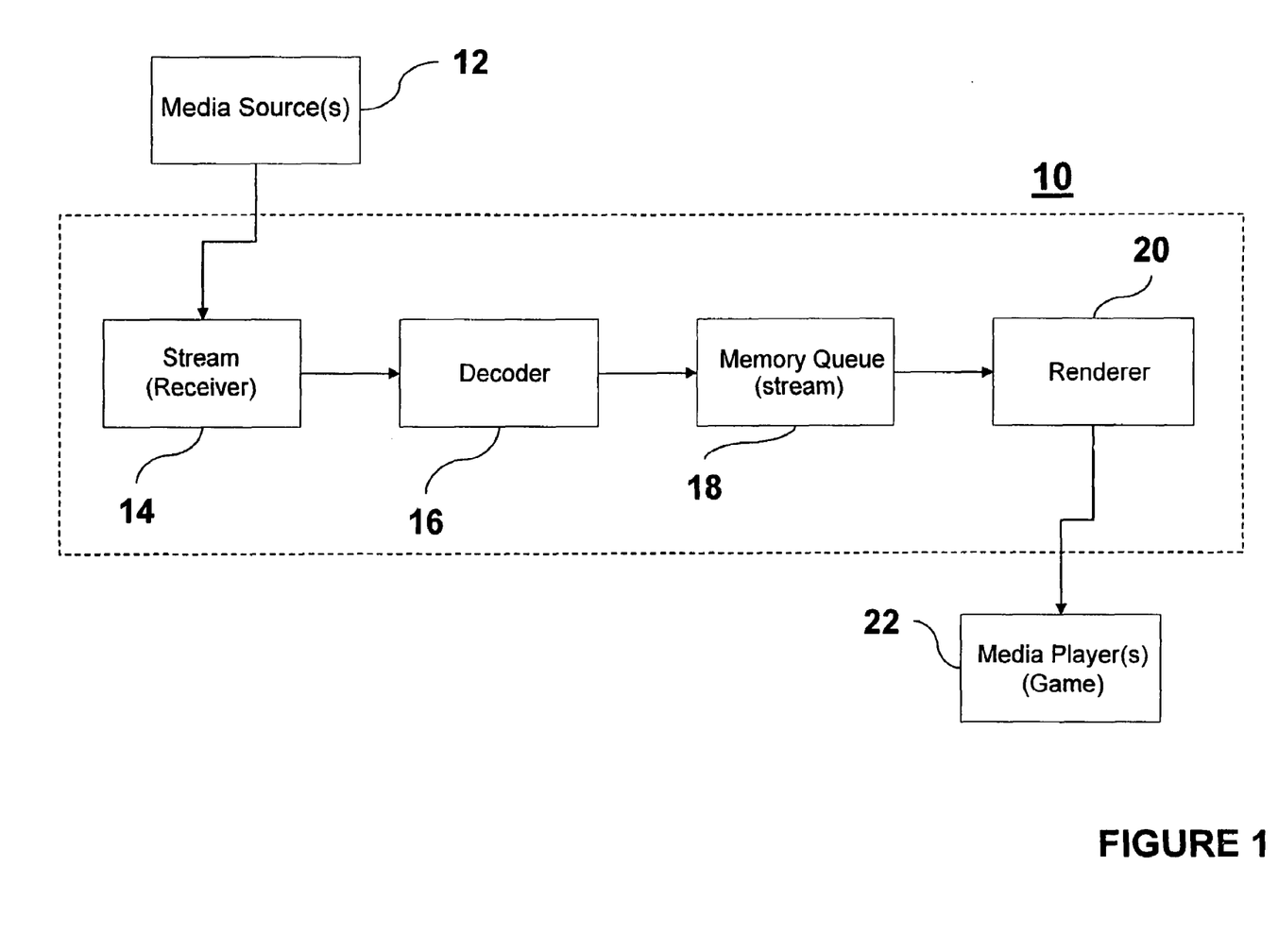
FIG. 1 is a block diagram of a system for providing media to a media player in accordance with an exemplary embodiment of the present invention.

FIG. 1 is a block diagram of a system 10 for providing media to a media player in accordance with an exemplary embodiment of the present invention. The system 10 comprises a receiver portion 14, a decoder portion 16, a memory portion 18, and a renderer portion 20. Media is provided by media source 12 and rendered via media player 22. As described herein, the exemplary embodiment of system 10 provides media to a game media player (e.g., Xenon), however the system 10 is not limited thereto. The system 10 is applicable to other appropriate types of media players, such as DVD players, CD players, monitors, and audio players, for example.

Media is provided to the system 10 via media source 12. The media source 12 can comprise a single media source or multiple media sources. Example media sources include a file, a queue, memory (e.g., semiconductor memory, registers), an HTTP source, a game source (e.g., Xmedia), an external drive (e.g., a hard disk drive, a DVD player, a CD player, a memory stick), a custom media source, a network, or a combination thereof. The media provided to the system 10 can be in accordance with any combination of the following formats: WAV, MP3, AAC (MP4), WMA, PCM, DPCM, and ADPCM. The system 10 is capable of accommodating at least the aforementioned media formats. The media provided to the system 10 can comprise any combination of multiple types of media. Example types of media include audio media, video media, image media (e.g., JPEG format, BMP format, TIFF format), game media (e.g., Xmedia), animation media, movie media, multi-media, or a combination thereof. As described in more detail below, media provided to the system 10 by media source 12 can be raw, formatted, encoded, or a combination thereof.

Media is provided to the receiver portion 14. The receiver portion 14 can comprise any appropriate receiver capable of receiving media from the media source(s) 12. In an exemplary embodiment of the present invention, the receiver 14 formats received media into streaming media. As is known in the art, streaming media is provided in a constant flow. Streaming media is advantageous for use with many types of media, because uninterrupted flow of media is achievable. Streaming media is particularly applicable to game media because users do not want to experience gaps or interruptions during game play. Although media provided by the receiver portion 14 is depicted as streaming media, it is not limited thereto. Media provided by the receiver portion 14 also can be provided in discrete entities (e.g., downloaded).

The decoder portion 16 receives media from receiver portion 14. If the media is encoded, the decoder portion 16 decodes the media in accordance with an appropriate decoder. The decoder portion 16 decodes media in accordance with any of the above described decoding techniques.

The memory portion 18 receives the decoded media from the decoder portion 16. The memory portion 18 can comprise any appropriate memory. Examples of appropriate memory include semiconductor memory, magnetic memory, static memory, volatile memory, optical memory, a register, or a combination thereof. In an exemplary embodiment of the present invention, the memory portion 16 is implemented as a memory queue. The decoder portion 16 provides decoded media to respective memory queues. That is, for each codec type, the decoded media is provided to a separate and dedicated memory queue. The dedication of a separate memory queue for each type of decoded media facilitates expeditious processing of media.

Decoded media is provided to the renderer 20 via the memory portion 18. The renderer 20 processes and/or formats the media for the media player 22. The system 10 can comprise one or more media players 22. The renderer 20 appropriately renders media for each media player 22 implemented. For example, if the media player 22 comprises a DVD player, the renderer 20 processes and formats media such that it can be rendered by the DVD player. If the media player 22 is a game media player (e.g., Xenon), the renderer processes and formats the audio, video, and/or animation media such that it can be properly rendered by the game media player.

Figure 2:
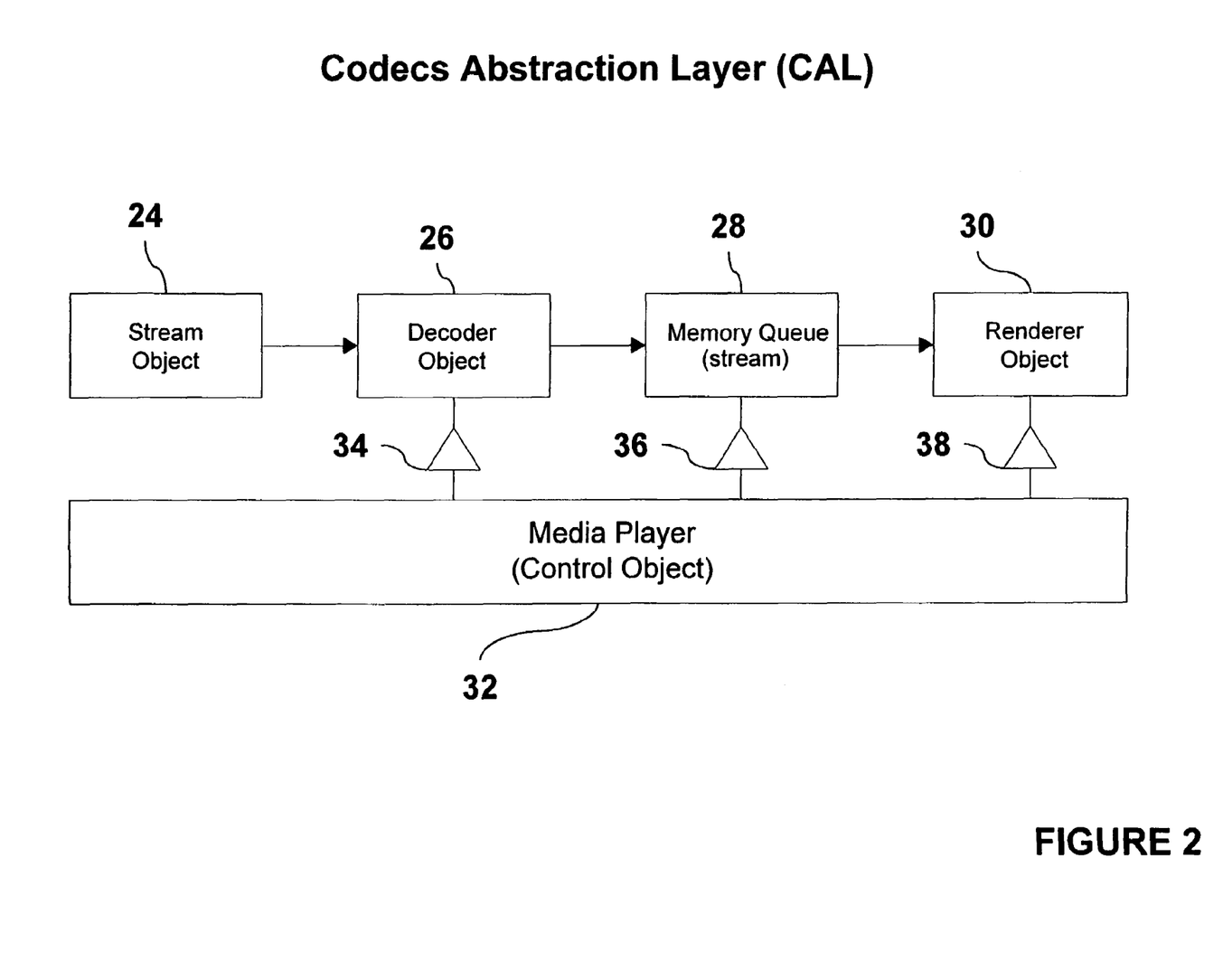
FIG. 2 is diagram of a single instance of a codecs abstraction layer (CAL) in accordance with an exemplary embodiment of the present invention.

FIG. 2 is diagram of a single instance of the CAL in accordance with an exemplary embodiment of the present invention. The CAL comprises stream object 24, decoder object 26, memory queue 28, and renderer object 30. The media player object 32 provides control via control signals 34, 36, and 38 to the decoder object 26, the memory queue 28, and the renderer object 30, respectively. Examples of the types of control provided by the control object 32 include play, stop, rewind, seek, abort, and select a stream, just to name a few.

The stream object 24 is used to load media from a given media source (e.g., file, a queue, memory (e.g., semiconductor memory, registers), an HTTP source, a game source (e.g., Xmedia), an external drive (e.g., a hard disk drive, a DVD player, a CD player, a memory stick), a custom media source, a network) and expose it to the other objects. The decoder object 26 takes an encoded media stream and decodes it using an appropriate codec. As described below, there is a decoder class for each codec envisioned to be utilized by the game system (e.g., Xenon). The renderer object 30 takes a stream, output from the decoder object 26 and provided via the memory queue 28, and renders the decoded media (e.g., via audio and video outputs) as controlled by the medial player object 32. One renderer class is implemented for each base class of decoder. For example, there is a base class decoder from which all audio decoders are derived, and there is a corresponding audio renderer class. The player object 32 is a client of the other classes designed for a specific task, such as playing audio, playing video, or playing DVD movies, for example. The media player object provides control to the decoder object 26, the memory queue 28, and the renderer object 30, via control signals 34, 36, and 38 respectively.

Figure 3:
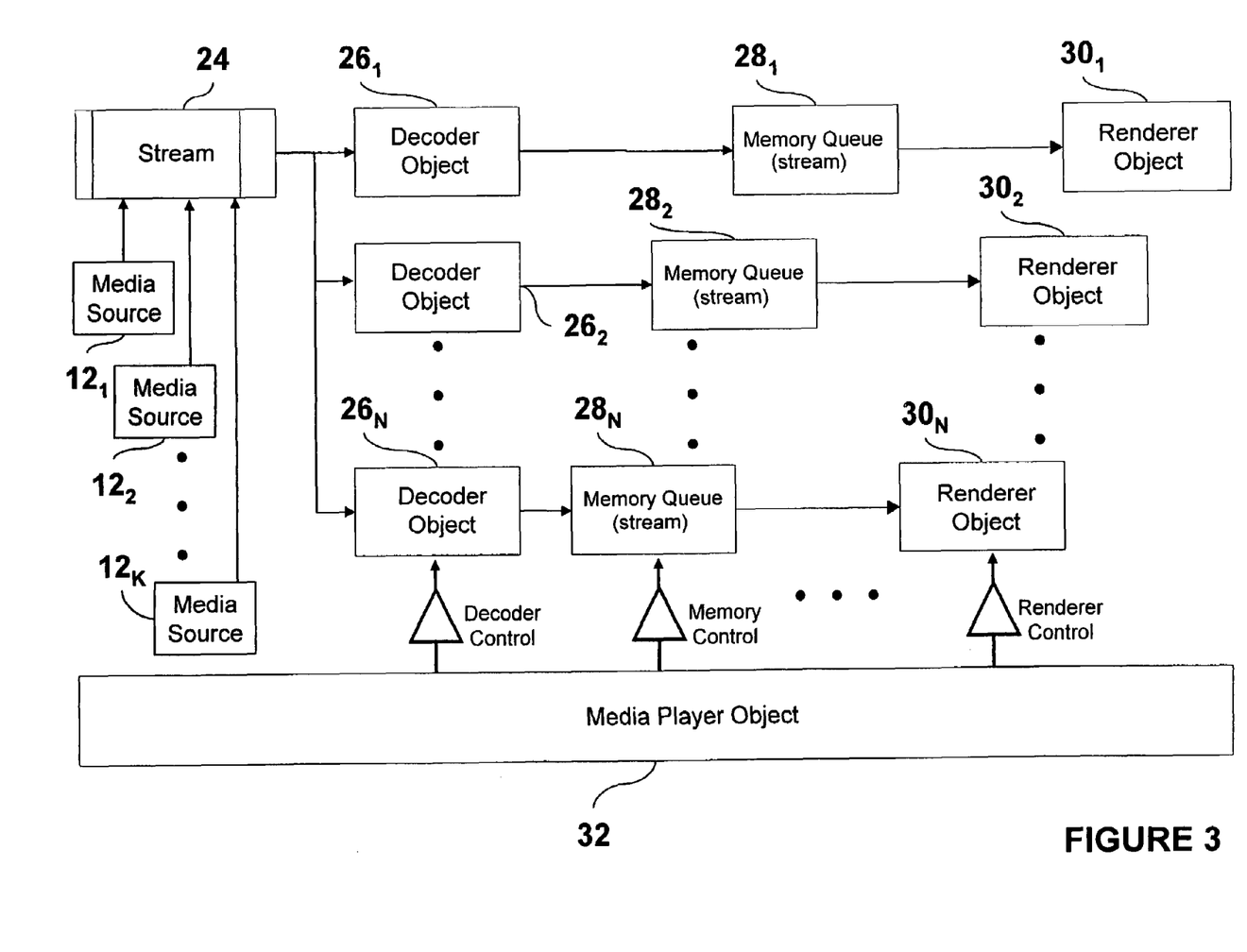
FIG. 3 is a diagram of the CAL showing multiple media sources, multiple decoder objects, multiple memory queues, and multiple renderer objects in accordance with an exemplary embodiment of the present invention.

FIG. 3 is a diagram of the CAL showing multiple media sources $12_1$-$12_K$, multiple decoder objects $26_1$-$26_N$, multiple memory queues $28_1$-$28_N$, and multiple renderer objects $30_1$-$30_N$, in accordance with an exemplary embodiment of the present invention. Media sources $12_1$ though $12_K$ represent the predetermined number of media sources that can be accommodated by the CAL. The stream object 24 formats the encoded media provided by the media sources $12_1$-$12_K$ into streaming media. The stream object 24 provides encoded, formatted media to decoder objects $26_1$ through $26_N$. The subscripts 1 through N represent the predetermined multiple number of codecs that can be accommodated by the CAL. Note, the predetermined number, K, does not necessarily have to be equal to the predetermined number N. Each media stream encoded with a specific encoding technique is provided to its respective decoder object. For example, WMA media received from media source $12_1$ can be formatting into streaming media by the stream object 24 and provided to the decoder object $26_1$ for decoding, and MP3 media received from media source $12_2$ can be formatting into streaming media by the stream object 24 and provided to the decoder object $26_2$ for decoding. Each decoder object $26_1$ through $26_N$ provides decoded streaming media to a respective renderer object $30_1$ through $30_N$ via a respective memory queue $28_1$ through $28_N$. Thus, as media sources are added, deleted or modified; as media formats are added, deleted, or modified; or as codecs are added, deleted, or modified; the CAL directs the media through respective instances of the processing chain.

Figure 4:
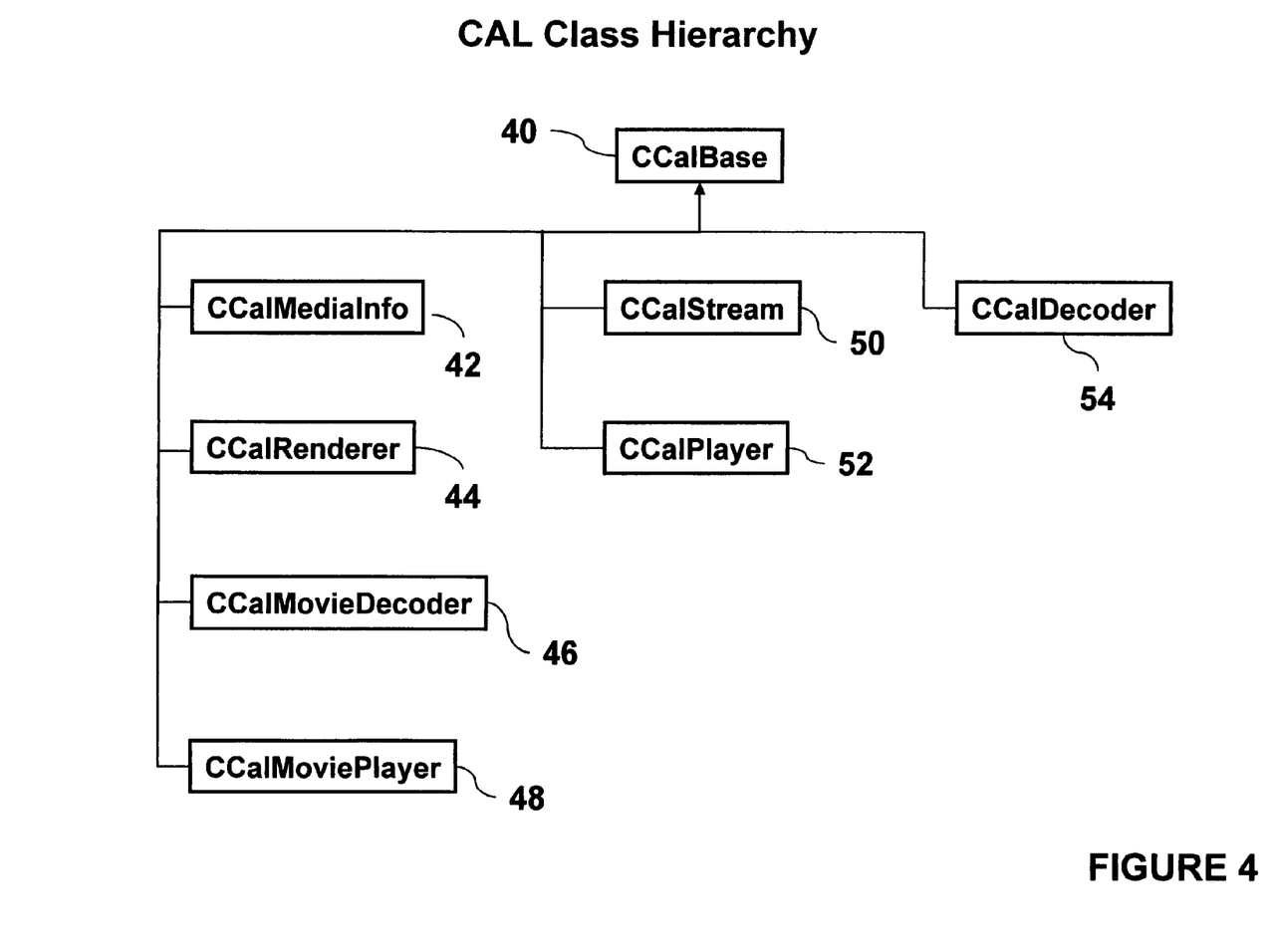
FIG. 4 is a class hierarchy diagram of the CAL in accordance with an exemplary embodiment of the present invention.

FIG. 4 is a class hierarchy diagram of the CAL showing base classes in accordance with an exemplary embodiment of the present invention. The CAL comprises a few base classes, from which all specific CAL classes derive. The base classes shown in FIG. 4 include CAL base class 40, Media Info base class 42, Renderer base class 44, Movie Decoder base class 46, Movie Player base class 48, Stream base class 50, Player base class 52, and Decoder base class 54. Media Info base class 42, Renderer base class 44, Movie Decoder base class 46, Movie Player base class 48, Stream base class 50, Player base class 52, and Decoder base class 54 are responsive to CAL base class 40. The Media Info base class 42 defines the variables and methods for objects associated with the media source. The Stream base class 50 defines the variables and methods for the stream object 24. The Decoder base class 54 and the Movie Decoder base class 46 define the variables and methods for the decoder object 26. The Renderer base class 44 defines the variables and methods for the renderer object 30. The Player base class 52 and the Movie Player base class 48 define the variables and methods for the medial player object 32. Each base class 42, 44, 46, 48, 50, 52, and 54 comprises its own subclasses that are respectively responsive thereto. Base classes are used to provide functionality common to their more specific derived classes. For example, an audio decoder and a video decoder have some similarities because they convert data from one form to another, regardless of the type of data. To consolidate code, that common functionality is moved into a base decoder class from which both the audio and video decoder would derive.

Figure 5:
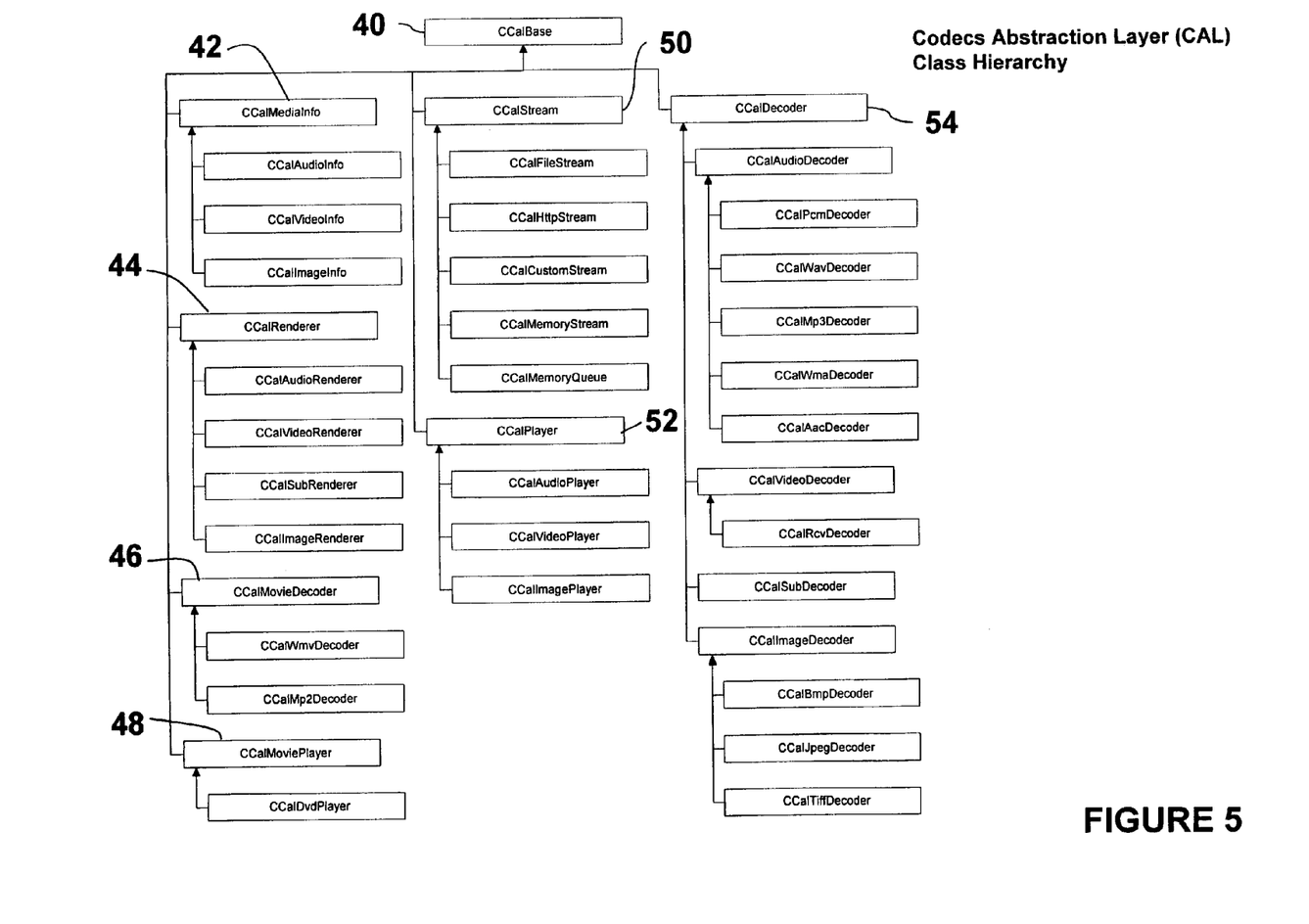
FIG. 5 is a more detailed class hierarchy diagram of the CAL showing sub-classes in accordance with an exemplary embodiment of the present invention.

FIG. 5 is a more detailed class hierarchy diagram of the CAL showing respective subclasses for base classes 42, 44, 46, 48, 50, 52, and 54 in accordance with an exemplary embodiment of the present invention. The Media Info base class 42 has responsive to it the following subclasses: an audio info class, a video info class, and an image info class. The Renderer base class 44 has responsive to it the following subclasses: an audio renderer class, a video renderer class, a sub renderer class, and an image renderer class. A sub renderer class is used for rendering a secondary video stream, such as closed captioning, over a main video stream. The Movie Decoder base class 46 has responsive to it the following subclasses: a WMV (Windows Media Video) decoder class and an MP2 decoder class. The Movie Player base class 48 has responsive to it a DVD player class. The Stream base class 50 has responsive to it the following subclasses: a file stream class, an HTTP stream class, a custom stream class, a memory stream class, and a memory queue class. The Player base class 52 has responsive to it the following subclasses: an audio player class, a video player class, and an image player class. The Decoder base class 54 has responsive to it the following subclasses: an audio decoder class, a video decoder class, a sub decoder class, and an image decoder class. The audio decoder class has responsive to it a PCM decoder class, a WAV decoder class, an MP3 decoder class, a WMA decoder class, and an AAC decoder class. The video decoder class has an RCV decoder class responsive thereto. The image decoder class has responsive to it a BMP decoder class, JPEG decoder, and TIFF decoder.

Figure 6:
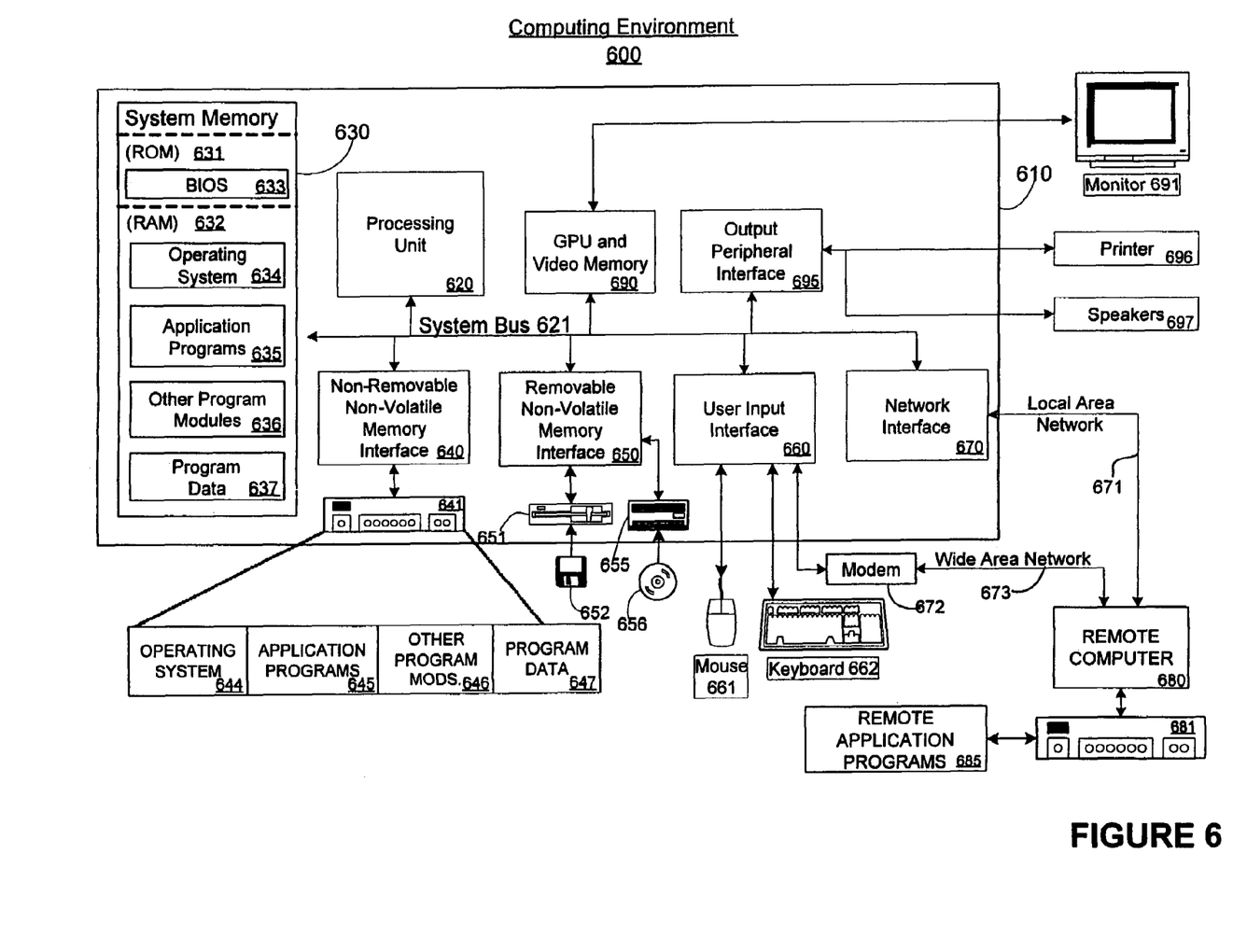
FIG. 6 is a block diagram showing an example computing environment in which aspects of the invention may be implemented.

Although the description of the present invention has been in the context of an exemplary game system capable of accommodating a plurality of codecs, it is also applicable to more generic computing environments wherein a plurality of codecs can be accommodated. FIG. 6 illustrates an example of a suitable computing system environment 600 in which an exemplary embodiment of the present invention can be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention can be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing the invention includes a general purpose computing device in the form of a computer 610. In an exemplary embodiment of the present invention, the computer 610 comprises a game console. Components of computer 610 can include, but are not limited to, a processing unit 620, a system memory 630, and a system bus 621 that couples various system components including the system memory to the processing unit 620. The system bus 621 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associaiion (VESA) local bus, and Peripheral Component Interconnect (PCI) bus (also known as Mezzanine bus).

The computer 610 typically includes a variety of computer readable media. Computer readable media can be any available media that can be accessed by computer 610 and includes both volatile and non-volatile media, removable and non-removable media. By way of example, and not limitation, computer readable media can comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or non-volatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 can also include other removable/non-removable, volatile/non-volatile computer storage media. By way of example only, FIG. 6 illustrates a hard disk drive 641 that reads from or writes to non-removable, non-volatile magnetic media, a magnetic disk drive 651 that reads from or writes to a removable, non-volatile magnetic disk 652, and an optical disk drive 655 that reads from or writes to a removable, non-volatile optical disk 656, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user can enter commands and information into the computer 610 through input devices such as a keyboard 662 and pointing device 661, commonly referred to as a mouse, trackball or touch pad. Other input devices (not shown) can include a microphone, joystick, game pad, satellite dish, scanner, or the like. These and other input devices are often connected to the processing unit 620 through a user input interface 660 that is coupled to the system bus, but can be connected by other interface and bus structures, such as a parallel port, game port or a universal serial bus (USB).

A monitor 691 or other type of display device is also connected to the system bus 621 via an interface, such as a video interface, which can comprise a graphics processing unit (GPU) and video memory 690. In addition to the monitor, computers can also include other peripheral output devices such as speakers 697 and printer 696, which can be connected through an output peripheral interface 695.

The computer 610 can operate in a networked environment using logical connections to one or more remote computers, such as a remote computer 680. The remote computer 680 can be a personal computer, a server, a router, a network PC, a peer device or other common network node, and typically includes many or all of the elements described above relative to the computer 610, although only a memory storage device 681 has been illustrated in FIG. 6. The logical connections depicted include a LAN 671 and a WAN 673, but can also include other networks. Such networking environments are commonplace in offices, enterprise-wide computer networks, intranets and the internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the internet. The modem 672, which can be internal or external, can be connected to the system bus 621 via the user input interface 660, or other appropriate mechanism. In a networked environment, program modules depicted relative to the computer 610, or portions thereof, can be stored in the remote memory storage device. By way of example, and not limitation, FIG. 6 illustrates remote application programs 685 as residing on memory device 681. It will be appreciated that the network connections shown are exemplary and other means of establishing a communications link between the computers can be used.

As mentioned above, while exemplary embodiments of the present invention have been described in connection with various computing devices, the underlying concepts can be applied to any computing device or system in which it is desired to accommodate a new and/or modified codecs without requiring modification of application code utilizing media processed via the new and/or modified codecs.

The various techniques described herein can be implemented in connection with hardware or software or, where appropriate, with a combination of both. Thus, the methods and apparatus of the present invention, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus of the present invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention can invariably be a combination of hardware and software.

A CAL in accordance with an exemplary embodiment of the present invention provides a unified, simple interface to multiple codecs coming from different sources. The complexity of adding new codecs is reduced. Low level codecs libraries can be replaced at any time without the need to revise client application code. Development time is reduced due to the ability to reuse code. The CAL provides a simple and unified mechanism for any codec to be exposed to game developers via XMedia library APIs. Input and output from CAL objects is abstracted via stream class which can be almost anything, such as a memory, file, a network, a queue, or a user defined input, for example. Implementation of the CAL improving system testing because by feeding data to and from the stream, it can be can be easily verified if individual components are working correctly.

While the present invention has been described in connection with the preferred embodiments of the various figures, it is to be understood that other similar embodiments can be used or modifications and additions can be made to the described embodiments for performing the same function of the present invention without deviating therefrom. For example, an exemplary embodiment of the present invention can comprise a media source extraction layer (MSAL) implemented between the media source and the stream object, as depicted for example, in FIG. 1. The stream object would interact with the MSAL and not the media source. Differences between media sources would be irrelevant to the stream object. New media sources could be introduced and used by the stream object without modifying the stream object. Thus, the present invention should not be limited to any single embodiment, but rather should be construed in breadth and scope in accordance with the appended claims.

What is claimed:

1. A method for providing media to a media player, said method comprising:
    receiving encoded media from at least one of a plurality of media sources; and
    decoding said encoded media using an applications programming interface (API) comprising a plurality of codec libraries wherein each codec library corresponds to each of the plurality of media sources, the API structured to have a class hierarchy comprising a Renderer base class corresponding to a rendering functionality that is common to a plurality of renderer objects derived from said Renderer base class to render disparate media types.

2. A method in accordance with claim 1, further comprising:
    formatting said received encoded media in accordance with a predetermined format; and
    providing said formatted encoded media for decoding.

3. A method in accordance with claim 1, wherein the Renderer base class comprises a) an audio renderer subclass, b) a video renderer subclass, c) an image renderer subclass and d) a sub renderer subclass, wherein the sub renderer subclass is used for rendering a secondary video stream contained in the encoded media.

4. A method in accordance with claim 1, wherein said encoded media comprises at least one of encoded audio media, encoded video media, encoded image media, encoded animation media, and encoded game media.

5. A method in accordance with claim 1, wherein said media is formatted in accordance with at least one of WAV, MP3, AAC, MP4, WMA, PAC, DPCM, ADPCM, JPEG, TIFF, and BMP.

6. A computer-readable storage medium having stored thereon, an application programming interface (API) for providing media to a media player, said API comprising:
    a plurality of decoder objects for receiving formatted media and for respectively decoding said formatted media using at least one of a plurality of codec libraries, wherein each of the plurality of codec libraries corresponds to each of a plurality of media sources;
    a plurality of renderer objects for receiving decoded media from respective ones of the plurality of decoder objects and rendering said decoded media for execution in at least one of a plurality of media players; and
    a media player control object configured to provide a plurality of control signals for controlling each of the plurality of decoder objects and each of the renderer objects.

7. A computer-readable storage medium in accordance with claim 6, wherein the API is structured to have a class hierarchy comprising a base class that corresponds to a functionality that is common to the plurality of decoder objects.

8. A computer-readable storage medium in accordance with claim 7, wherein the base class comprises at least one subclass.

9. A computer-readable storage medium in accordance with claim 6, wherein said formatted media is provided by a media source comprising at least one of a file, memory, an http source, a queue, a custom source, a network, and a game media source.

10. A computer-readable storage medium in accordance with claim 6, wherein said formatted media comprises at least one of encoded audio media, encoded video media, encoded image media, encoded animation media, and encoded game media.

11. A computer-readable storage medium in accordance with claim 6, wherein said formatted media is formatted in accordance with at least one of WAV, MP3, AAC, MP4, WMA, PAC, DPCM, ADPCM, JPEG, TIFF, and BMP.

12. A computer-readable storage medium in accordance with claim 6, wherein said rendered media comprises at least one of audio media, video media, image media, movie media, and game media.

13. A system for abstracting audio-video codecs, the system comprising:
    a media source comprising a codec configured to generate an encoded media signal; and
    a computing device coupled to the media source, the computing device containing a computer-readable storage medium having stored thereon at least one application programming interface (API), wherein the at least one API is a codecs abstraction layer (CAL) program that is executed for generating a decoded media signal from the encoded media signal, the CAL program structured to have a class hierarchy comprising a Renderer base class corresponding to a rendering functionality that is common to a plurality of renderer objects, and wherein the Renderer base class comprises a) an audio renderer subclass, b) a video renderer subclass, c) an image renderer subclass and d) a sub renderer subclass, wherein the sub renderer subclass is used for rendering a secondary video stream contained in the encoded media.

14. The system of claim 13, wherein the media source comprises at least one of a file, memory, an http source, a queue, a custom source, a network, and a game media source.

15. The system of claim 13, further comprising a media player coupled to the computing device, the media player configured to receive the decoded media signal from the computing device and generate therefrom, a media player output.

16. The system of claim 13, wherein the CAL further comprises a plurality of codec libraries wherein each of the codec libraries corresponds to each of a plurality of media sources.

17. The system of claim 13, wherein the class hierarchy further comprises a) a Media Info base class, b) a Movie Decoder base class, c) a Movie Player base class, d) a Stream base class, e) a Player base class, and f) a decoder base class.

18. The system of claim 13, wherein the secondary video stream is used for providing closed captioning in a media player coupled to the computing device.

* * * * *